April 20, 1965 H. M. SWINDLER 3,178,872
ROTARY DISK CUTTER WITH A SPECIFIC HOUSING THEREFOR
Filed March 15, 1963 3 Sheets-Sheet 1
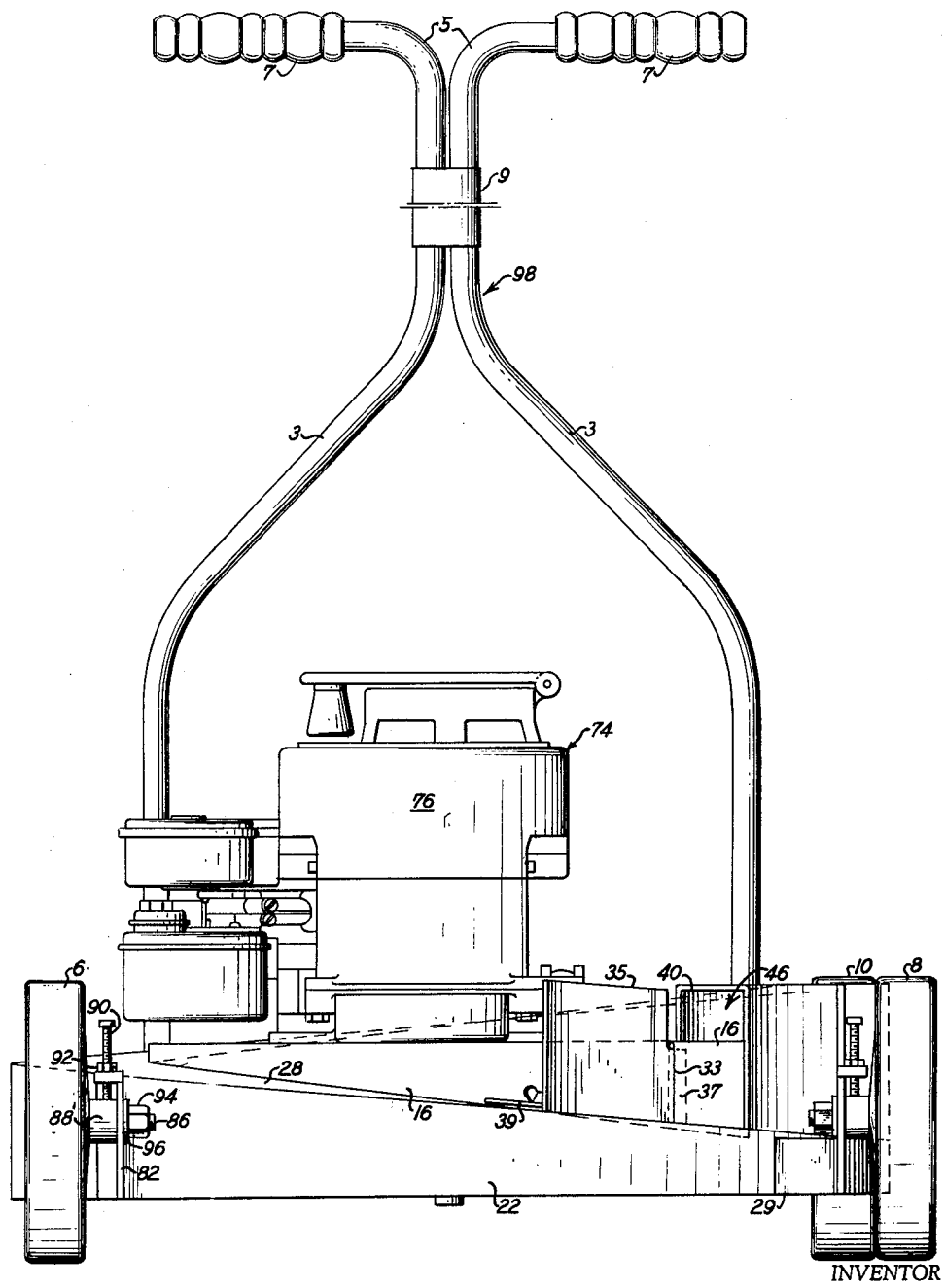
INVENTOR
HARRY M. SWINDLER.
BY *Jacobi & Davidson*
ATTORNEYS

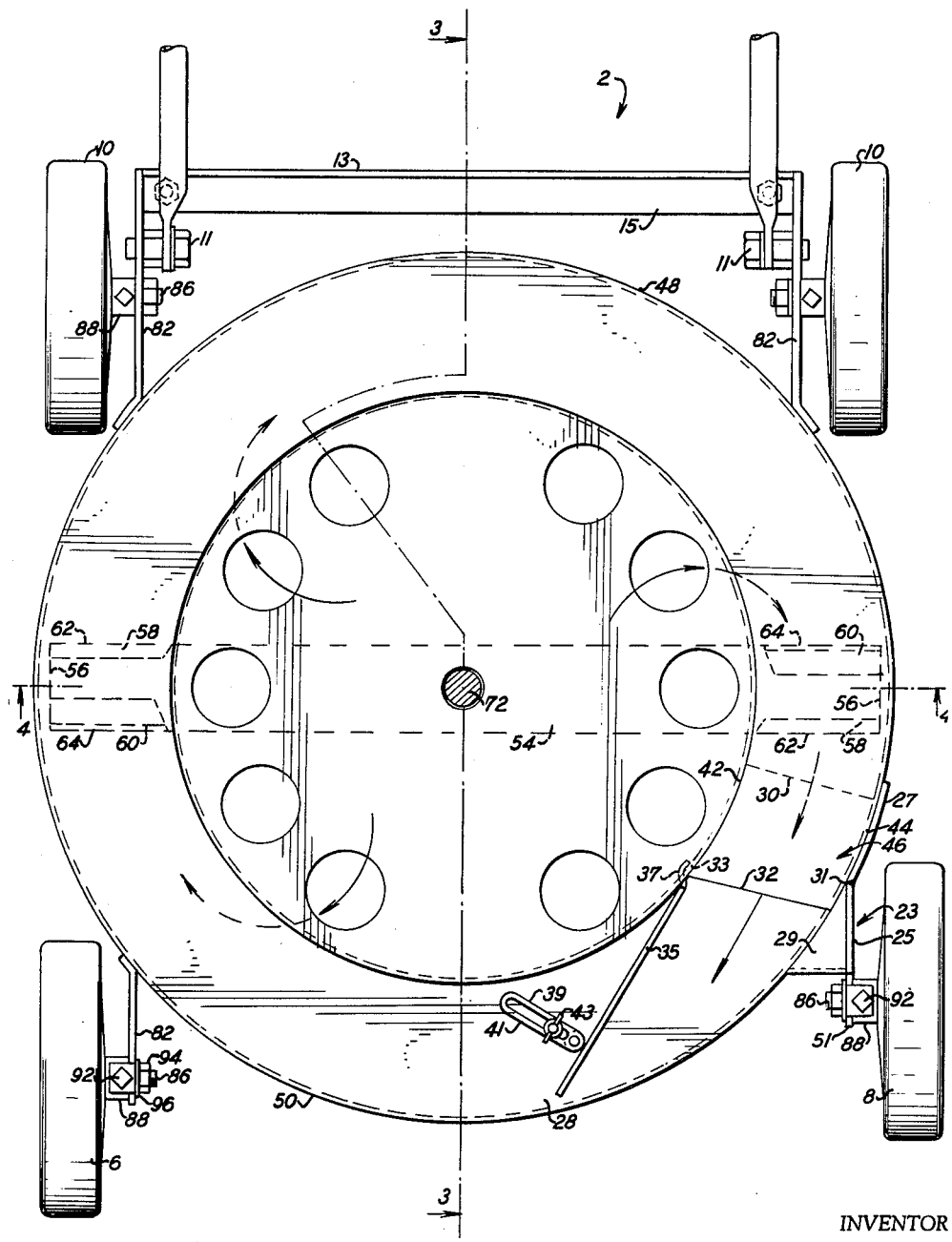

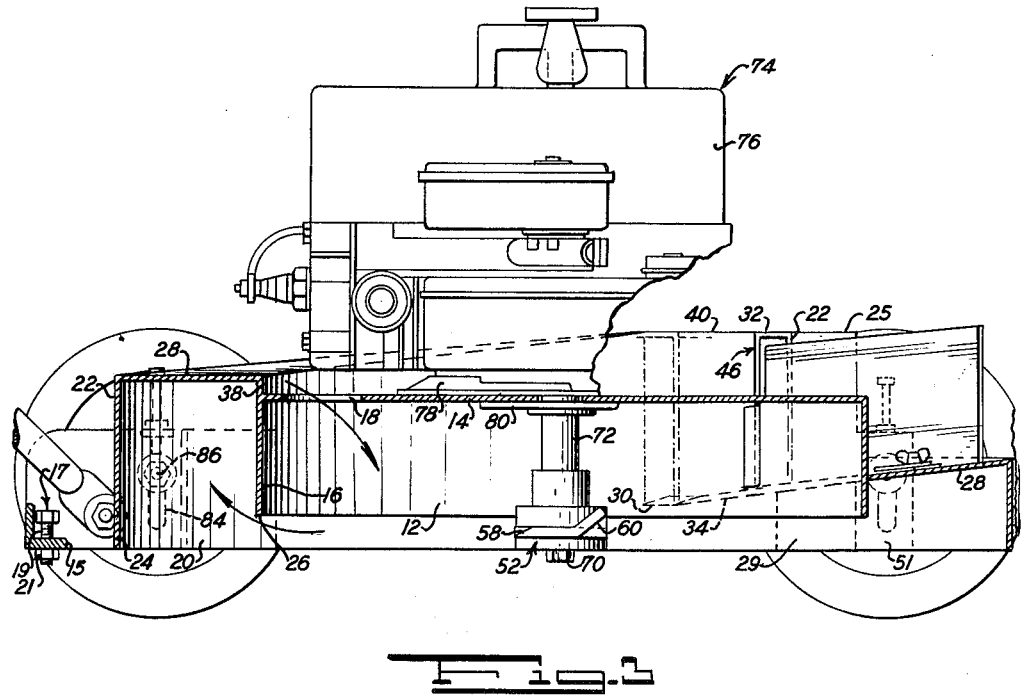
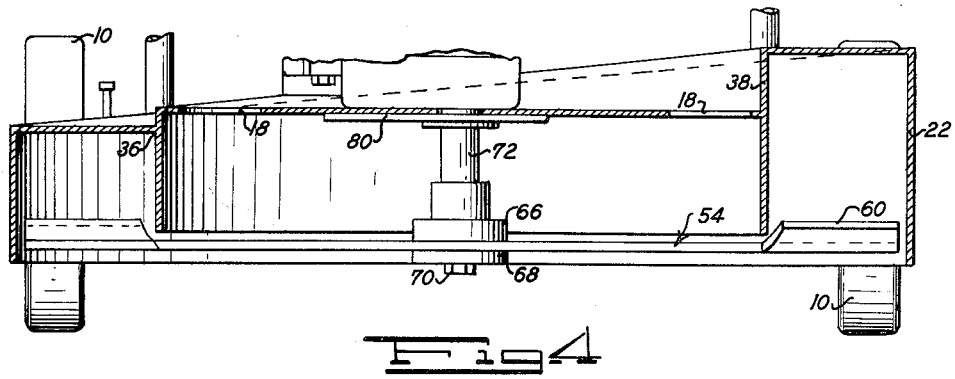

United States Patent Office 3,178,872
Patented Apr. 20, 1965

3,178,872
ROTARY DISK CUTTER WITH A SPECIFIC
HOUSING THEREFOR
Harry M. Swindler, Rockbridge County, Va., assignor to Industrial Products Corporation, Lexington, Va., a corporation of Virginia
Filed Mar. 15, 1963, Ser. No. 265,445
3 Claims. (Cl. 56—25.4)

This invention relates to improvements in apparatus for cutting vegetation and more particularly to mowers of the type adapted to be pushed over a surface so as to cut the vegetation growing thereon to a predetermined height above the surface level, in such a manner as to remulch vegetation cuttings, whereby the finished lawn surface is free from objectionable ridges and steaks, the mower of the present invention being unusually efficient under a wide variety of circumstances, even when the lawn surface is moist or wet.

This application contains certain subject matter which is common to my prior application, Serial No. 138,841, filed September 18, 1961, now Patent No. 3,141,283, and entitled "Apparatus for Cutting Vegetation."

Various types of mowers adapted to cut surface vegetation, or as commonly known "lawn mowers," have heretofore been suggested. Generally, the lawn mowers may be divided into two types, namely, the reel-type and the rotary-type. Reel-type mowers basically comprise a frame having ground engaging wheels disposed at opposite ends thereof, an elongate generally drum-shaped blade structure supported within the frame and rotatable about a horizontal axis with the ground engaging wheels, and a handle extending upwardly from the frame whereby a user can push the assembly over a surface to be mowed. The rotary-type mower, on the other hand, basically comprises a frame structure supported on ground engaging wheels, a blade element or elements mounted for rotation about a vertical axis, means to drive the blade element or elements, and a handle extending upwardly from the frame whereby the user can push the mower over a surface. The present invention is particularly concerned with rotary-type mowers, and thus it should be understood from the outset that the term "rotary-type" refers to the latter type of basic structure referred to in detail above.

While rotary-type mowers are known to possess certain advantages over reel-type mowers, prior assemblies of both types, to the best of my knowledge, are subject to causing ridges or streaks in the cut surface. Moreover, the available prior constructions adapted to cut an area of any substantial width do not effectively collect and segregate cuttings, or completely control direction of discharge. And, such prior art constructions are prone to leave objectionable deposits of cuttings on finished lawn surfaces.

Furthermore, prior art constructions are also prone towards accumulation of deposits of cuttings on the underside of the frame to such an extent that they must be manually removed before cutting operations are complete. If the vegetation being mowed is moist or wet, the accumulation of cuttings deposited on the underside of the frame becomes so extensive, that mowing of moist or wet vegetation is virtually impossible.

Accordingly, one of the primary objects of the present invention is to provide an improved mower of the rotary-type, which mower is not subject to the aforesaid disadvantages. More specifically, a primary object of the primary invention is to provide a rotary-type mower adapted to be moved over a surface having vegetation growing thereon so as to cut the vegetation without ridges and streaks therein regardless of the surface contour and irregularities therein, said mower being so constituted and arranged as to unusually efficiently cut or sever the vegetation under a wide variety of circumstances, and even when the lawn surface is moist or wet.

Still a further primary object of the present invention is to provide a mower conforming with the preceding objects, which mower is particularly adapted to receive and segregate vegetation cuttings, and to direct the discharge thereof forwardly of the mower within the limits of the path cut by the mower, whereby complete mulching and remulching of vegetation cuttings is insured, thus virtually eliminating damage and unslightly accumulation of vegetation cuttings on the finished lawn.

Additional, still further, and yet more specific objects of the present invention are (a) to provide in a lawn mower the improvement which comprises a detachable blade enclosing hood adapted to guard the cutting blade of a blade assembly and to collect and direct vegetation cuttings forwardly and outwardly thereof; (b) to provide in a lawn mower the improvement which comprises detachably coupling a blade enclosing housing having a forwardly opening arcuate outlet chute section to the mower assembly proper so as to achieve efficient mulching; (c) to provide in a mower of the rotary-type, the improvement comprising a detachable blade enclosing housing having at least one compartment adapted to receive and segregate cuttings deflected thereinto by a cutting blade, and to convey the cuttings to an outlet opening for delivery in a predetermined direction forwardly of the mower; (d) to provide such a mower assembly which is particularly adapted to sever and deflect vegetation cuttings upwardly into a blade enclosing housing having an integral helical chute disposed arcuately peripherally of the housing, said chute having a forwardly disposed discharge opening for directing vegetation cuttings only on uncut vegetation in front of the mower, whereby such cuttings are thoroughly mulched; (e) to provide such a mower assembly comprising a blade enclosing housing, said blade enclosing housing having a centrally disposed compartment and a helical delivery chute integral therewith and disposed arcuately peripherally thereabout, said centrally disposed compartment having apertures providing a pneumatic airflow system for pneumatically conveying vegetation cuttings to a discharge opening in the helical delivery chute at velocities which preclude accumulation of cuttings on the enclosing surfaces of the discharge chute regardless of the moisture content thereof, whereby all mower surfaces are maintained virtually free from any accumulation of vegetation cuttings, and (f) to provide such a mower assembly which can be easily and inexpensively manufactured and which, in addition, is trouble-free in continued operation.

Although the preferred embodiment of the invention comprises a mower of the rotary-type conforming with each of the above-stated general and specific primary objects, auxiliary primary objects of the instant invention include the provision of certain improvements in mower construction regardless of the specific arrangement of basic components therein. More specifically, important auxiliary objects of the present invention are: (a) to provide in a lawn mower the improvement which comprises a blade assembly having cutting edges and fan edges for pneumatically conveying vegetation cuttings into a detachably mounted blade enclosing housing, said blade enclosing housing comprising, in turn, a centrally disposed compartment and an integral helical discharge chute disposed arcuately peripherally thereabout, said blade assembly and blade enclosing housing being so constituted and arranged as to efficiently collect and convey vegetation cuttings to a discharge opening in said helical discharge chute, whereby moist or wet vegetation can be unusually efficiently mowed, and; (*b*) to provide in a lawn mower the improved construction and arrangements of component parts comprising a blade assembly and a blade enclosing housing, said blade enclosing housing having an integral helical discharge chute for collecting vegetation cuttings and for directing the discharge of said cuttings only forwardly within the limits of the path cut by the mower, whereby complete and thorough mulching of vegetation is assured and damage to and unsightly accumulations of vegetation cuttings upon a finished lawn surface is virtually eliminated.

The invention lies in the combination, construction, arrangement, and disposition of the various components and means incorporated in a mower assembly constructed in accordance herewith. The invention will be better understood and objects other than those specifically set forth above will become apparent when consideration is given to the following detailed description. Such description refers to the annexed drawings, presenting the preferred and illustrative embodiments of the invention, and wherein:

FIGURE 1 is an elevational view of a mower constructed in accordance with the present invention;

FIGURE 2 is a top plan view of the mower shown in FIGURE 1;

FIGURE 3 is a partially elevational and partially sectional view of the mower shown in FIGURE 1, the sectional portion of FIGURE 3 being taken on the line 3—3 of FIGURE 1, and FIGURE 4 is a cross-sectional view taken along the line 4—4 of FIGURE 2.

Reference is now made more specifically to the drawing for purposes of explaining the detailed aspects of the instant development.

In the figures, the overall mower assembly, constructed in accordance with the present invention, is generally designated by the reference character 2 and, as shown, comprises a blade enclosing housing, generally designated by the reference character 4, a plurality of front wheels 6 and 8 and a plurality of rear wheels 10.

The blade enclosing housing 4 may be fabricated of any suitable material and in any suitable manner and, comprises a centrally disposed compartment 12, of substantially annular configuration, having a generally horizontally disposed wall 14 and a generally vertically disposed or downwardly extending wall or skirt 16.

The horizontal wall or roof 14 of the compartment 12 is provided with apertures 18 positioned annularly thereabout substantially adjacent the periphery of the compartment 12. The apertures 18 comprise an inlet for the flow of air into the compartment 12 and, therefore, comprise, in conjunction with the compartment 12, a portion of an airflow system, in a manner more fully described infra.

The number of apertures 18 shown is intended by way of illustration only and is not intended by way of limitation. Therefore, the number may be varied in a manner considered readily apparent to one skilled in the art. Similarly, the shape of the apertures shown in the drawings is intended by way of illustration only, and is not intended by way of limitation. Therefore, the shape of the apertures 18 may be varied as desired, as is and in a manner considered readily apparent to those skilled in the art. In conjunction with changing the number and shape of the apertures 18, the shape of the centrally disposed compartment 12 may also be changed in accordance therewith. In this latter connection, for example, the skirt 16 may be angularly disposed with respect to the roof 14 rather than being disposed substantially at right angles with respect thereto.

The blade enclosing housing 4 further comprises a discharge chute 20 of substantially helical configuration, which discharge chute is integrally connected to the compartment 12 arcuately or annularly about the periphery thereof. Since the discharge chute 20 is integral with the compartment 12, one wall of the chute 20 is comprised of the skirt 16. Additionally, the chute 20 has another wall 22 which, as is the case with the skirt 16, is generally vertically disposed or downwardly extending. Note, however, that the wall 22 extends downwardly to a greater extent than the wall 16, as particularly illustrated in FIGURE 3. Therefore, the lower annular edge 24 of the wall 22 is positioned below the lower annular edge 26 of the skirt 16, the plane in which the annular edge 24 lies being in spaced parallel relationship, therefore, with respect to the plane in which the annular edge 26 lies. The discharge chute 20 is, as pointed out supra, of helical configuration. In order to develop the helical discharge chute 20 arcuately or annularly about the periphery of the centrally disposed compartment 12, an integral wall 28 is positioned and extends between the skirt 16 and the wall 22. This wall 28 comprises, in effect, the roof of the helical discharge chute 20, and has a first or lower end 30 and another, or second or upper end 32. The helical discharge chute 20, therefore, begins at the end 30 and, after being helically developed annularly about the periphery of the centrally disposed compartment 12, terminates at the other, or second end 32. As particularly illustrated in FIGURE 3, the first end 30 of the helical discharge chute 20 extends between the skirt 16 and the wall 22 at a point positioned slightly above the lower annular edge 26 of the skirt 16. The helix forming the discharge chute 20 is annularly developed about the centrally disposed compartment 12 until the roof 28 of the discharge chute overlaps itself. The helical discharge chute 20, therefore, is annularly continuous completely about the periphery of the centrally disposed compartment 12. In addition, a small portion of the roof 28 substantially adjacent the other end 32 thereof overlies a small portion of the roof 28 substantially adjacent the first end 30 thereof. The small portion of the roof 28 substantially adjacent the end 30 thereof, designated by the reference character 34, therefore comprises a floor for that portion of the discharge chute 20 substantially adjacent the other end 32 thereof.

As pointed out supra, the roof 28 of the discharge chute 20 begins at a point positioned slightly above the lower edge 26 of the skirt 16. As the roof 28 is helically developed annularly about the periphery of the centrally disposed compartment 12, the development of the helix forming the discharge chute 20 will eventually position the inner edge 36 of the roof 28 thereof in a plane substantially in alignment with the plane in which the roof 14 of the centrally disposed compartment 12 lies. Thereafter, development of the helix forming the discharge chute 20 will result in extension of the skirt 16 in a generally vertically disposed direction, but upwardly of the plane in which the roof 14 lies. As pointed out supra, the skirt 16 forms one wall of the helical discharge chute 20, and, it is to be noted, that the upward extension of the skirt 16, designated by the reference character 38, comprises an integral component part of this one wall.

The helical discharge chute 20 is, as pointed out supra, annularly continuous completely about the periphery of the centrally disposed compartment 12, and terminates at the other end 32 thereof. In accordance with this construction, however, the helical development of the discharge chute 20, by which the height of the discharge chute 20 increases annularly about the periphery of the centrally disposed compartment 12, is terminated in the vertical plane in which the first end 30 of the roof 28 of the discharge chute lies. Therefore, that portion of the roof 28 disposed and extending between the vertical plane in which the first end 30 lies and the vertical plane in which the other end 32 lies, designated by the reference character 40, is level. Stated in other words, a small portion of the roof 28, designated by the reference character 40, positioned substantially adjacent the other or second end 32, lies in a plane disposed in spaced parallel relationship with respect to the plane in which the roof 14 of the centrally disposed compartment 12 lies. And, stated in still further words, the portion 34 of the roof 28 of the discharge chute disposed and extending between the plane in which the first end 30 lies and the other end 32 lies is angularly disposed with respect to the plane in which the portion 40 of the roof 28 lies, the portion 40 of the roof 28 also being disposed and extending between the plane in which the first end 30 lies and the plane in which the other end 32 lies, as pointed out supra. Note, therefore, in accordance with this construction, that the portion 34, comprising a floor of the discharge chute 20, is in a diverging angular relationship with respect to the portion 40.

Furthermore, that portion of the discharge chute 20 comprising the portion 34 and the portion 40 of the roof 28 thereof, and additionally, that portion of the upward extension 38, designated by the reference character 42, and that portion of the wall 22 designated by the reference character 44, disposed and extending between the vertical plane in which the first end 30 of the roof 28 lies, and the vertical plane in which the other and second end 32 of the roof 28 lies, comprises a discharge opening, generally designated by the reference character 46, for the discharge chute 20. And, the position of the discharge opening 46 annularly about the periphery of the centrally disposed compartment 12, is determined or chosen so that the discharge opening 46 faces forwardly of the mower 2, as particularly illustrated in FIGURE 2. As particularly illustrated in that figure, the blade enclosing housing 4, in toto, is annularly configured and, therefore, comprises an annulus having a rearwardly disposed or facing segment 48 and a frontally disposed or facing segment 50. Since the discharge opening 46 of the helical discharge chute 20 is positioned annularly about the periphery of the centrally disposed compartment 12 so that the same faces forwardly of the mower 2, the discharge opening 46 is, therefore, positioned along the frontal segment 50 of the annulus comprising the blade enclosing housing 4.

The mower 2 of the present invention therefore comprises an annular blade enclosing housing 4, said blade enclosing housing comprising a centrally disposed compartment 12 of annular configuration, and a helical discharge chute 20 integral with the centrally disposed compartment and positioned annularly continuous about the periphery thereof. The helical discharge chute 20 comprises, in turn, a completely enclosed discharge opening 46 having floor 34, a roof 40, and at least two side walls 42 and 44. The discharge opening 46 is, as pointed out supra, positioned along the frontal segment 50 of the annulus comprising the blade enclosing housing 4, whereby the discharge opening 46 is rendered capable of discharging in a direction only forwardly and outwardly of the mower 2 and within the limits of the path of vegetation cut or severed thereby.

The mower 2, constructed in accordance with the present invention, comprises further a blade assembly, generally designated by the reference character 52. The blade assembly 52 comprises, in turn, a diametral blade support 54 fabricated of any suitable material and in any suitable manner. The longitudinal dimensional extent of the diametral blade support 54 is approximately equal to the diameter of the blade enclosing housing 4. As particularly illustrated in FIGURE 2, therefore, the longitudinal dimension extent of the diametral blade support 54 is such as to position the ends 56 of the support substantially adjacent to but within the external periphery of the blade enclosing housing 4, as defined by the wall 22 thereof. Positioned upon the diametral blade support 54 at the ends 56 thereof, is a cutting blade 58 and a fan blade 60. Therefore, each end 56 of the diametral blade support 54 has positioned thereupon a cutting blade 58 and a fan blade 60. Preferably, the blade assembly 52 is structurally operatively associated with the mower 2 in such a manner as to rotate the blade assembly in a generally clockwise direction as viewed in FIGURE 2. In accordance with this construction, therefore, the cutting blade 58 is positioned upon the diametral blade support 54, and particularly, at the end 56 thereof, so that each of the cutting blades 58 will lead or precede the fan blades 60. Stated in other words, the cutting blades 58 are positioned upon the leading edges 62 of the diametral blade support 54, and the fan blades 60 are positioned upon the trailing edges 64 thereof. In this manner, therefore, the cutting blades 58 will first perform the function of cutting or severing the vegetation and the fan blades 60 will subsequently perform the function of directing the vegetation cuttings into the helical discharge chute 20 and induce an airflow in the discharge chute whereby the vegetation cuttings will be pneumatically conveyed therethrough and discharged from the discharge opening 46 thereof. The cutting blades 58 and the fan blades 60 preferably are fabricated integrally with the diametral blade support 54. This may be accomplished in any suitable manner. It is to be understood, however, that the cutting blades 58 and the fan blades 60 may be fabricated other than integrally with the blade support 54. Similarly, the number of cutting blades 58 and fan blades 60 as shown in the drawings, is intended by way of illustration only and not by way of limitation. Accordingly, therefore, the number of cutting blades 58 and fan blades 60 may be altered as desired, the same being considered well within the scope of one ordinarily skilled in the art.

As pointed out supra, the blade assembly 52 preferably rotates in a clockwise direction as indicated in FIGURE 2. To this end, the blade assembly 52 is non-rotatably positioned upon and connected to a rotatable drive shaft 72. Thus, a first blade support ring 66 is positioned upon and in abutting engagement with the upper surface of the diametral blade support 54. And, a second blade support ring 68 is positioned upon and in abutting engagement with the undersurface of the diametral blade support 54. The two blade support rings 66 and 68 are maintained in abutting engagement with the diametral blade support 54 whereby the blade support rotates with the blade support rings 66 and 68, in any suitable manner, as indicated at 70. The blade support rings 66 and 68 are, in turn, non-rotatably positioned upon the rotatable drive shaft 72.

The rotatable drive shaft 72 is driven by a power means, generally designated by the reference character 74. The power means as shown comprises a gas engine; however, it should be understood that the power means can comprise any suitable motor whether of the two-cycle or four-cycle gas-type, or of the electric-type. The important aspect of the invention in this regard is that some motor means is provided for driving the blade assembly 52 and, accordingly, the cutting blades 58 and the fan blades 60 thereof, the motor shown in FIGURE 3 is designated by the numeral 76 and is mounted or positioned upon a support plate 78 overlying the upper surface of the roof 14 of the centrally disposed compartment 12. An other support plate 80 is positioned against the undersurface of the roof 14, and the two support plates 78 and 80 maintained in fixed relationship with respect thereto in any suitable manner. Of course, the rotatable drive shaft 72, connected to the power means 74 so as to be rotatably driven thereby, is suitably rotatably journaled within the support plates 78 and 80 and the roof 14.

As indicated supra, the cutting blades 58 are provided and positioned upon the leading edges 62 of the diametral blade support 54. To this end, the leading edges 62 of the blade support preferably are beveled to such an extent as to provide for efficient cutting or severing of vegetation. This is particularly illustrated in FIGURE 3. Therefore, the plane in which the cutting edges 58 lie is angularly disposed with respect to the horizontal plane in which the diametral blade support 54 lies. And, as also indicated supra, the trailing edges 64 of the blade support 54 are provided with fan blades 60, whereby to induce an airflow within the helical discharge chute 20. To this end, the trailing edges 64 of the diametral blade support 54 are turned upwardly, as clearly indicated in FIGURE 3, whereby the trailing edges lie in a plane angularly disposed with respect to the horizontal plane in which the blade support lies.

The mower 2 comprises, as indicated supra, a pair of rear wheels 10. The rear wheels 10 are rotatably positioned upon or mounted with respect to the mower 2. To this end, a pair of leg brackets 82 are positioned upon and fixedly connected to the wall 22 of the blade enclosing housing 4. More specifically, the leg brackets 82 are connected to the rearwardly disposed segment 48 of the annulus comprising the blade enclosing housing 4. As best shown in FIGURE 3, the leg brackets 82 have a vertical shaft-receiving slot 84 therein and each of the rear wheels 10 is mounted on a wheel shaft 86 extending through, and slidable within, the receiving slot 84. The leg brackets 82 have affixed thereto a collar 88 projecting laterally outwardly of the plate-like leg brackets and also have a slot therein aligned with the slot 84. The laterally outwardly projecting collar 88 has a threaded bore (not shown) disposed vertically therein, and this bore is adapted to receive a threaded lug 90 whereby the height of the slot 84 can be adjusted with respect to the wheel shaft 86. By virtue of this construction, the vertical height of the wheel shaft 86 can be readily adjusted continuously, and, as is considered readily apparent, the cutting height of the blade assembly 52 with respect to the vegetation to be mowed can be predetermined or preset. A lock nut such as that designated by the numeral 92 can be provided in mutual cooperative engagement with the lug 90 to permit maintaining of the lug in any preset or predetermined position. Similarly, a lock nut 94 and cooperating washer 96 are provided for non-rotatably journaling the wheel shaft 86 with respect to the collar 88 and the leg brackets 82.

It will be understood that each of the leg brackets 82 is provided with the above particularly described assembly for vertically adjusting the height of the wheel shaft 86 with respect to the leg brackets and the collar 88. With regard to the rear wheels 10, the particular form which the wheels take and the manner in which they are rotated on the wheel shafts 86 form no part of the instant invention. Any suitable wheels can be used, as well as any suitable arrangement for mounting the wheels for rotation about the wheel shafts.

The mower 2 is provided with a handle, generally designated by the reference character 98, whereby the mower is capable of being propelled and guided upon and about a lawn surface having vegetation to be cut or severed, that is, vegetation to be moved. The handle 98 comprises a plurality of annular or cylindrical handlebar supports 3, of suitable configuration, terminating in a plurality of handlebars 5. The handlebars 5 preferably are integral with the bar supports 3 and are particularly adapted to have suitable handle grips 7 positioned thereupon. The handle grips 7 may be fabricated of any suitable material, such as rubber, as is considered readily apparent to those skilled in the art. The handle 98 is particularly adapted to have positioned thereupon a suitable control adjustment, generally designated by the reference character 9. The control adjustment 9 preferably is positioned adjacent the handlebars 5, that is, substantially adjacent the upper end of the handle 98. The control adjustment 9, in the mower shown in the drawings, is essentially a throttle lever adapted to govern the speed of the motor, and/or control the choke thereof. However, it will be readily apparent that the control adjustment 9 can serve any purpose depending upon the particular type of power means 74 employed.

Each of the handle bar supports 3 is rotatably journaled upon and with respect to a corresponding and cooperating leg bracket 82, as indicated at 11. Additionally, an L-shaped cross-beam 13 is positioned and extends between, and is connected to, the leg brackets 82. The beam 13 comprises a generally horizontally disposed leg 15 having a plurality of handle supports, generally designated by the reference character 17, positioned thereupon and mutually cooperatively engageable therewith. Each of the handle supports 17 are positioned upon the leg 15 of the cross-beam 13 substantially vertically in alignment with each of the handle bar supports 3, for a purpose presently to be described. The handle supports 17 comprise a lug 19 and a lock-nut 21, whereby the height of the lug 19 can be vertically adjusted with respect to the leg 15. The supports 17 comprise a stop or abutment for the handle 98, whereby, when the mower 2 is not in use, the handle may be brought to rest and positioned thereupon. The handle 98 is, therefore, always maintained in a position convenient for use.

As indicated supra, the mower 2 comprises a plurality of front wheels 6 and 8. The front wheel 6 is mounted upon the blade enclosing housing 4 in a manner similar to the manner in which the rear wheels 10 are mounted upon the housing. To this end, a leg bracket 82 is provided, which leg bracket is positioned upon and fixedly connected to the wall 22 of the blade enclosing housing 4 and particularly, along the frontal segment 50 of the annulus comprising the blade enclosing housing 4. Further description of the manner in which the front wheel 6 is positioned upon the mower 2 is not deemed necessary, therefore, it being understood that the same component parts are provided for mounting the front wheel 6 as are provided for mounting the rear wheels 10. Furthermore, since the same component parts are used for mounting the front wheel 6, it is noted that the height of the front wheel 6 with respect to the leg bracket 82 may be vertically adjusted in the same manner in which the height of the rear wheels 10 are vertically adjusted.

The front wheel 8 is mounted upon the mower 2 in a manner similar to the manner in which the front wheel 6 and the rear wheels 10 are mounted. In this connection, the same component parts are provided for adjusting the vertical height thereof. A leg bracket, generally designated by the reference character 23, is provided for mounting the front wheel 8 upon the frontal segment 50 of the annulus comprising the blade enclosing housing 4. This leg bracket 23 comprises a vertical partition 25 extending frontally and outwardly of the mower 2 and in spaced parallel relationship with respect to the leg bracket 82 mounting the front wheel 6 upon the mower. A first mounting section 27 is connected to the partition 25 in any suitable manner, and, may be integrally connected thereto. This mounting section is rearwardly extending of the partition 25 and is of curvilinear configuration. The height of the first mounting section 27 preferably is equal to the height of the partition 25 and, therefore, extends from the lower edge of the wall 22 to the roof 40 of the discharge opening 46. A second mounting section 29 is connected to the partition 25. The mounting section 29, which may be fabricated integrally with the partition 25, extends laterally of the partition 25 and is also of curvilinear configuration. With regard to the vertical extent or the height of the second mounting section 29, it is noted that the total vertical extent or height of the blade enclosing housing 4 at one point of connection 31 of the mounting section 29 to the partition 25 is equal to the total vertical extent or height of the discharge opening 46 and the vertical distance between the roof 28 and the lower annular edge 24 of the annular wall 22. Since, as can be particularly seen in FIGURE 2, the second mounting section 29 extends annularly forwardly of the terminating end 32 of the discharge chute 20, the total vertical extent or height of the second mounting section 29 is no greater than the vertical distance between the roof 28 and the lower annular edge 24 of the annular wall 22. The mounting section 29 is curvilinear, as is the mounting section 27. The rate of curvature of each of these mounting sections 27 and 29, respectively, is equal to the rate of curvature of the annular wall 22, whereby the curvilinear portion of each of the mounting sections may be positioned flush against the annular wall 22. An extension 51 extends forwardly and substantially in alignment with the partition 25, which extension is particularly adapted to have all of the component parts mutually cooperatively engaged therewith for rotatably mounting the front wheel 8 and vertically adjusting the height thereof with respect to the leg bracket 82, said component parts being particularly described supra in conjunction with the rear wheels 10. And, as indicated supra, any suitable wheels can be used as well as any suitable arrangement for rotatably mounting the wheels upon the wheel shaft 86.

The annular skirt 16 has a narrow vertically disposed longitudinally dimensionally extensive aperture 33 positioned therethrough, said aperture 33 being located annularly about the periphery of the skirt 16 substantially adjacent the terminating end 32 of the discharge chute 20. A fin 35, the purpose of which will be particularly described infra, is adapted to be mutually cooperatively engaged with the aperture 33. To this end, the fin 35 is provided with an extension 37 particularly adapted to be disposed within the aperture 33, the height or vertical extent of the extension 37 being substantially equal to the vertical extent or the height or the longitudinal dimensional extent of the aperture 33. It is noted that the fin 35 is angularly disposed with respect to a tangent drawn at the point or location of the aperture 33 about the annular skirt 16. The degree of angular disposition of the fin 35 with respect to the said tangent is adjustable, and, to this end, there is provided an adjusting bar 39 having a slot 41 therein for mutual cooperative engagement with a wing nut 43. The wing nut 43 threadably cooperates with the roof 28 of the discharge chute 20 in any suitable manner, whereby the adjusting bar 39 may be moved towards and away from the fin 35. Thus, by releasing the wing nut 43 and moving the adjusting bar 39 with respect to the fin 35, the angular disposition of the fin 35 with respect to the above-mentioned tangent may be varied, the same being accomplished by virtue of the fact that the extension 37 loosely mutually cooperatively engages the aperture 33, whereby the fin is pivotally movable with respect to the annular skirt 16. In accordance with this construction, therefore, the angular disposition of the fin 35 with respect to the axis of the discharge opening 46, comprising the floor 34, the roof 40, and the walls 42 and 44, can be varied.

It will be understood, therefore, that there is provided a means for severing vegetation, said means comprising the cutting blades 58 which are positioned upon and are contiguous with the leading edges 62 of the diametral blade support 54. Additionally, the fan blades 60, positioned upon and contiguous with the trailing edges 64 of the diametral blade support, comprise a means for inducing a pneumatic current within the blade enclosing housing 4 whereby vegetation cuttings severed by the cutting blade 58 are pneumatically conveyed into and through the helical discharge chute 20 and forwardly and outwardly of the discharge opening 46 thereof. In this connection, as the diametral blade support 54 rotates in a generally clockwise direction as viewed in FIGURE 2, the fan blades 60 induce a flow of air from above the blade enclosing housing 4, through the apertures 18, and into the helical discharge chute 20. Additionally, a flow of air from without the blade enclosing housing 4 and about the periphery thereof, under the lower annular edge 24 of the wall 22, and into the helical discharge chute 20 is induced. Thus, the means for inducing a pneumatic current, comprising the fan blades 60, induces a dual pneumatic current into and through the helical discharge chute 20 and forwardly and outwardly of the discharge opening 46 thereof, when taken in conjunction with the centrally disposed compartment 12 having the apertures 18. Stated in other words, in order to emphasize this most significant aspect of the present invention, while the fan blades 60 provide a means for inducing a pneumatic current from without the blade enclosing housing 4, underneath the lower annular edge 24 of the wall 22, and into and through the helical discharge chute 20, the fan blades 60 taken in conjunction with the centrally disposed compartment 12 having the apertures 18 provides a means for inducing a dual pneumatic current in the helical discharge chute 20, whereby vegetation cuttings can be pneumatically conveyed into and through the discharge chute and forwardly and outwardly of the discharge opening 46 thereof. The helical discharge chute 20, per se, comprises a means providing a helical discharge path arcuately or annularly about the periphery of the centrally disposed compartment 12 for discharging vegetation cuttings forwardly and outwardly of the blade enclosing housing 4.

It can be seen in the drawing, and particularly in FIGURES 2 and 4, that the cutting blades 58 and the fan blades 60 are contained or disposed or positioned only within the helical discharge chute 20, that is, contained only within the annulus defined by the skirt 16 and the wall 22. This, taken in conjunction with the means for inducing a dual pneumatic current, comprising the fan blades 60 and the centrally disposed compartment 12 having the apertures 18, will maintain vegetation cuttings entirely within the helical discharge chute 20, until discharge through the discharge opening 46 thereof. Thus, vegetation cuttings will be substantially completely excluded from the centrally disposed compartment 12, whereby the centrally disposed compartment will be maintained free from accumulation of vegetation cuttings. Additionally, in accordance with the above construction, the cross-sectional area of the helical discharge chute 20 preferably is chosen to be relatively small, whereby the velocity of air flow therein and therethrough is so high as to prevent vegetation cuttings from adhering to the surfaces of the discharge chute, which surfaces are defined by the wall 22, the roof 28 and the skirt 16. Thus, even when a lawn surface is moist or wet, the mower 2, constructed in accordance with the present invention, is unusually efficient in operation. It can be seen, therefore, that the mower 2 of the present invention is capable of use when convenient, without regard to the moisture content of the vegetation to be severed. Not only are vegetation cuttings prevented from accumulating upon the wall of the centrally disposed compartment 12 defined by the inner surface of the skirt 16 and the undersurface of the roof 14, but such vegetation cuttings are also substantially precluded from accumulating upon the rotatable drive shaft 72 and the blade assembly 52. It can be seen, therefore, that the interior of the blade enclosing housing 4 is maintained substantially free from accumulation of vegetation cuttings, whereby the blade enclosing housing, and thus the mower 2, is rendered unusually easy to maintain in a clean condition.

The fin 35, which is pivotally movable with respect to the skirt 16, taken in conjunction with the adjusting bar 39, provides an adjustable means for directing vegetation cuttings forwardly and outwardly of the blade enclosing housing 4 within the limits of the path of vegetation severed by the mower subsequent to discharge of the cuttings from the helical discharge chute 20. In this manner, it is assured that vegetation cuttings are discharged upon uncut vegetation, whereby such vegetation cuttings will be mulched and remulched, thus rendering lawn surfaces mowed by the mower 2 of the present invention free from objectionable ridges and streaks, and objectionable accumulations of cuttings. It is to be understood that the means for directing and guiding vegetation cuttings forwardly and outwardly of the discharge opening 46 subsequent to discharge of the cuttings therefrom is supplemented by the vertically disposed partition 25 of the leg bracket 23. Thus, as can particularly be seen in FIGURES 2 and 3, since the partition 25 is positioned substantially adjacent the discharge opening 46, the same will aid the pivotable fin 35 in directing and guiding the vegetation cuttings forwardly and outwardly of the discharge opening.

The power unit 74, in conjunction with the rotatable drive shaft 72 and the blade support rings 66 and 68, comprises a means for providing rotational movement to the blade assembly 52 and, thus, the cutting blades 58 and the fan blades 60 thereof. With regard to the operation of the mower 2, the handle 98 comprises a means for moving and guiding the mower over a lawn surface having vegetation to be severed. As indicated supra, it is desired that the handle 98 be maintained in a position conveniently reached when the mower is not in use. To this end, an adjustable abutment means is provided comprising the vertically adjustable lugs 19 and the lock nuts 21, taken in conjunction with the horizontally disposed leg 15 of the L-shaped cross-beam 13, said adjustable abutment means maintaining the handle in a convenient position even when the mower 2 is not in use. As pointed out supra, the adjustable abutment means is positioned upon and along the leg 15 in vertical alignment with each of the handle bar supports 3. This relationship is particularly illustrated in FIGURES 2 and 3.

With particular regard to FIGURE 2, it is noted that the front wheels 6 and 8 are staggered. That is, the axis of the front wheel 6, as defined by the wheel shaft 86 thereof, is offset with respect to the axis of the wheel 8, as defined by the wheel shaft 86 thereof. Stated in still further words, one of the front wheels is disposed forwardly of the other of the front wheels, and, as shown, the front wheel 6 is disposed or positioned forwardly of the front wheel 8. Additionally, one of the rear wheels 10 is laterally offset with respect to the front wheel 8. This is particularly illustrated in FIGURE 2. With this arrangement, the height of the cut of the vegetation being severed by the mower 2 of the present invention is substantially independent of any depression or other surface irregularities which may exist within or laterally of but substantially adjacent the cutting path. Thus, the present invention provides a mower which not only precludes objectionable ridges and streaks upon a lawn surface having vegetation to be severed by virtue of the arrangement for continuously remulching vegetation, as pointed out supra, but also precludes such objectionable ridges and streaks by virtue of the arrangement of the front wheels 6 and 8. Additionally, with regard to the front wheels 6 and 8 and the rear wheels 10, as pointed out supra, the height thereof with regard to or with respect to the leg brackets 82 and 23 and, therefore, with respect to the blade enclosing houring 4, is adjustable. The vertical adjustment of the front wheels 6 and 8 and the rear wheels 10 with respect to the blade enclosing housing 4 is accomplished by releasing the lock nut 92 and vertically adjusting the lug 90 with respect to the collar 88, whereby the collar 88 will vertically move within the slot 84. These component parts, therefore, comprise an adjustable means for variably vertically positioning each of the wheels with respect to the blade enclosing housing 4 and, therefore, with respect to the mower 2. This adjustable means for vertically variably positioning the wheels with respect to the blade enclosing housing 4 performs the function, as is considered readily apparent, of presetting or predetermining the height of the cut to be made by the blade assembly 52.

The operation and the manner of use of the mower 2 of the present invention is considered readily apparent from the above description. Prior to use, the height of the cut to be made by the blade assembly 52 of the mower can be preset or predetermined by vertically adjusting the height of the front wheels 6 and 8 and the rear wheels 10 with respect to the blade enclosing housing 4. In view of the cooperation between the adjustable abutment assemblies 17 and the handle 98, by which the handle is maintained in a convenient position even during periods of non-use, the handle is easily gripped when it is desired to use the mower. The mower 2 can now be moved and guided over a lawn surface having the vegetation to be cut or severed. Upon positioning the mower 2 on the lawn surface to be mowed the power unit 74 is placed into operation, whereby the blade assembly 52 rotates in a generally clockwise direction as viewed in FIGURE 2. As the mower 2 is moved and guided over the lawn surface to be mowed, the cutting blades 58 of the blade assembly 52 severs the vegetation vertically therealong in accordance with the height of the blade assembly with respect to the vegetation as preset or predetermined by vertically adjusting the front wheels 6 and 8 and the rear wheels 10 with respect to the blade enclosing housing 4. And, as the blade assembly 52 rotates in its generally clockwise direction, the fan blades 60 deflect the vegetation cutting into the helical discharge chute 20. Additionally, the fan blades 60 induce a dual pneumatic current within the helical discharge chute 20, whereby the vegetation cuttings are pneumatically conveyed through the helical chute and discharged from the discharge opening 46 thereof. In this manner, vegetation cuttings are pneumatically conveyed through and discharged from the helical discharge chute 20 forwardly and outwardly of the blade enclosing housing 4 within the limits of the path of vegetation being severed by the mower 2. The adjustable fin 35, as described supra, guides the discharge of the vegetation cuttings forwardly and outwardly of the housing 4 subsequent to the discharge thereof from the opening 46. In this manner, as is considered readily apparent, vegetation cuttings are deposited only upon uncut vegetation, whereby such vegetation cuttings are continuously remulched, thus leaving lawn surfaces free from objectionable accumulation of vegetation cuttings and ridges and streaks. As pointed out supra, the angular disposition of the fin 35 with respect to the axis of the discharge opening 46 can be adjusted.

The dual pneumatic current within the helical discharge chute 20 is induced by the fan blades 60 taken in conjunction with the centrally disposed compartment 12 having the apertures 18. Thus, as the fan blades 60 rotate in a generally clockwise direction, a flow of air is induced from above the blade enclosing housing 4, through the apertures 18, and into and through the helical discharge chute 20. Additionally, a flow of air is induced from without the blade enclosing housing 4, underneath the lower annular edge 24 of the annular wall 22 and into and through the discharge chute. This dual pneumatic current not only performs the function of pneumatically conveying vegetation cuttings into, through and out of the helical discharge chute 20, but also performs the function of maintaining the interior surfaces of the centrally disposed compartment 12, comprising the inner surface of the skirt 16 and the undersurface of the roof 14, free from accumulation of vegetation cuttings. In a similar manner, the rotatable drive shaft 72 and the blade assembly 52, comprising the diametral blade support 54, is also maintained free from accumulation of vegetation cuttings. The blade enclosing housing 4 and, thus the mower 2, in toto, is maintained in a substantially clean condition, and can be used without regard to the moisture content of the vegetation to be cut. Thus, the mower 2 of the present invention is unusually efficient even when it is raining.

After reading the foregoing detailed description of the preferred and illustrative mower incorporating the various embodiments of my invention, it will be understood that the objects set forth at the outset of this specification have been successfully achieved.

What is claimed is:

1. In a vegetation mower of the rotary type, having a blade enclosing housing and a cutting blade rotatably mounted in said housing, the improvement comprising:

said housing having a central portion and a continuous helical chute extending peripherally about said central portion;

said chute being defined by spaced inner and outer side walls depending substantially perpendicularly from said central portion;

said outer side wall depending from the peripheral edge of said central portion;

said inner side wall being spaced inwardly from the peripheral edge of said central portion and depending therefrom to thus be spaced a finite distance inwardly from said outer side wall;

that area of said central portion disposed above and between said inner and outer side walls defining a roof wall closing the top of said chute;

said chute having an inlet end and an outlet end, with said chute expanding through more than 360° around said central portion whereby said outlet end is disposed over and beyond said inlet end;

said cutting blade being disposed within said housing beneath said central portion;

said cutting blade having upstanding fan means thereon which terminate at an upper edge;

said fan means being disposed in said chute between said inner and outer side walls;

said inner side wall terminating in a lower edge which extends downwardly beyond the upper edge of said fan means;

said outer side wall terminating in a lower edge which extends downwardly beyond the lower edge of said inner side wall and beyond the plane of rotation of said cutting blade;

said cutting blade thus being disposed within said outer side wall and beneath said inner side wall with said fan means being upstanding into said chute between said side walls;

said central portion having at least one opening therein spaced inwardly of said inner side wall to thus communicate the interior of said housing with the atmosphere;

said cutting blade being adapted for rotation within said housing whereby said fan means draws air downwardly through said opening, around the lower edge of said inner side wall, then back upwardly into said chute between its side walls to thus create an air flow in said chute which causes the vegetation mowed by said cutting blade to be conveyed toward the outlet end of said chute.

2. The improvement defined in claim 1 but further characterized by a plurality of ground-engaging wheels attached to said housing to facilitate movement thereof across the vegetation to be mowed, and means for adjusting said housing and wheels relative to one another to thus adjust the elevation of said cutting blade above said vegetation.

3. The improvement defined in claim 1 wherein said cutting blade has a sharpened leading edge and a trailing edge and wherein said fan means are attached at said trailing edge whereby said sharpened leading edge will sever the vegetation while said fan means will direct the severed vegetation into said chute.

References Cited by the Examiner
UNITED STATES PATENTS

| | | | |
|---|---|---|---|
| 1,899,564 | 2/33 | Frey | 56—25.4 |
| 2,071,872 | 2/37 | Cockburn | 56—25.4 |
| 2,708,334 | 5/55 | Coners | 56—255 X |
| 2,720,070 | 10/55 | Arrington | 56—23 |
| 2,855,744 | 10/58 | Phelps. | |
| 2,888,796 | 6/59 | Denney | 56—25.4 |
| 2,942,400 | 6/60 | Sylvester | 56—25.4 X |
| 2,953,887 | 9/60 | Boesch et al. | 56—23 |
| 2,953,888 | 9/60 | Phillips et al. | 56—25.4 |
| 2,983,096 | 5/61 | Phelps | 56—255 |
| 3,015,927 | 1/62 | Caldwell | 56—25.4 |
| 3,037,341 | 6/62 | Collins | 56—25.4 X |
| 3,085,386 | 4/63 | Slemmons | 56—25.4 |

ANTONIO F. GUIDA, *Acting Primary Examiner.*

CARL W. ROBINSON, *Examiner.*